March 4, 1930.  R. J. EVANS  1,749,631
BRAKE LINING
Filed Dec. 8, 1928  2 Sheets-Sheet 1
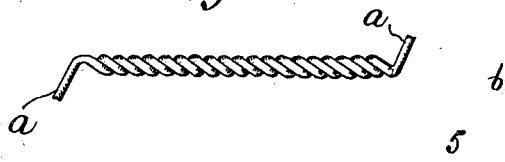
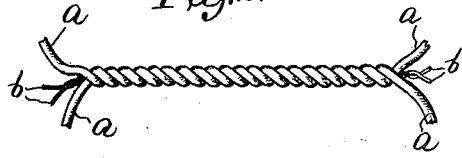
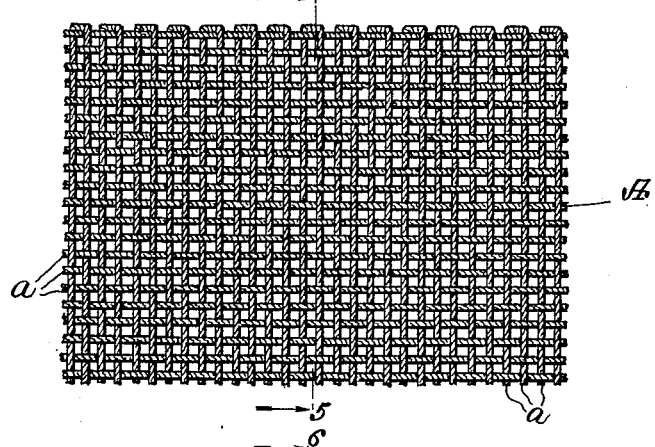
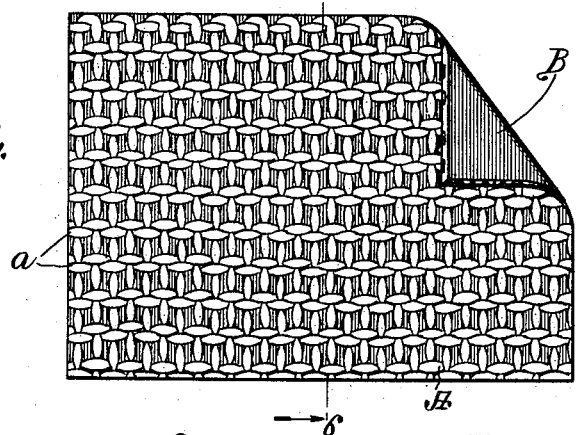
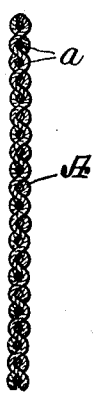
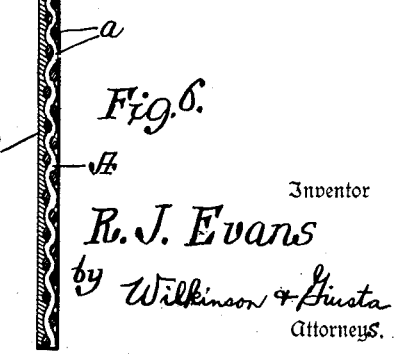
Inventor
R. J. Evans
by Wilkinson & Giusta
Attorneys.

March 4, 1930. R. J. EVANS 1,749,631
BRAKE LINING
Filed Dec. 8, 1928 2 Sheets-Sheet 2

Inventor
R. J. Evans
by Wilkinson & Giusta
Attorneys.

Patented Mar. 4, 1930

1,749,631

UNITED STATES PATENT OFFICE

RICHARD J. EVANS, OF HUNTINGTON, INDIANA

BRAKE LINING

Application filed December 8, 1928. Serial No. 324,716.

My invention relates to an improved construction of brake lining for the friction brakes of automobiles, trucks, or the like vehicles, or for use in braking rotary drums or shafts of any kind where it is desired to secure quick and efficient adjustment of the brake, and in which the brake lining does not tend to stick to the drum when released and in which the wear takes place uniformly, as the engaging surface of the brake lining wears. In other words, my invention is intended to provide a brake lining having a high co-efficiency of friction and great durability under intense wear, uniformity of friction, resistance substantially unaffected by moisture and temperature conditions, and which does not stick when the brake lever is released.

My invention will be more clearly understood after reference to the accompanying drawings in which like parts are indicated by similar reference symbols throughout the several views, and in which Figure 1 shows a strand of asbestos fiber twisted comparatively tightly, but without the addition of any other material.

Figure 2 shows two strands of asbestos of Figure 1 having combined therewith strands of fine flexible wire.

Figure 3 shows a woven fabric made of the strands of Figure 2, which are permeated before weaving with a fire-proof liquid such as silicate of soda, the warp threads and the woof threads being of equal strength and crossing each other at equal intervals so as to give equal strength to the material in either transverse or longitudinal direction.

Figure 4 shows the fabric of Figure 3 after it has been thoroughly dried, and after it has been coated on one side with a mineral friction compound composed of rubber and other material, as will be hereinafter described.

Figure 5 shows a cross section of Figure 3 along the line 5—5 of said figure.

Figure 6 shows a cross section of Figure 4 along the line 6—6 and looking in the direction of the arrows.

In the manufacture of my improved brake lining, first I twist the fibers of asbestos as secured from the rock into special hard multiple yarns $a$, as shown in Figure 1.

Then I twist up with one or more of these asbestos yarns one or more strands of fine wire $b$, for example, .008 brass wires, the product being a cord of twisted yarn and wire, as shown in Figure 2. These cords are then treated with the permeating fire-proof liquid solution containing silicate of soda (water glass), and after such treatment and partial drying, these yarns are woven into an open mesh or fabric A, as shown in Figure 3. The weaving is of the ordinary basket weave, and the woof threads are preferably of the same strength and distance apart as are the warp threads, so that the fabric is of substantially the same strength transversely and longitudinally.

After the fabric has been so formed, it is treated and thoroughly dried so as to harden the fire-proof liquid solution, causing the silicate to cement the asbestos fibers together, thus producing a hardened woven fire-proof fabric. This fabric, shown at A in Figure 3, is then treated on one side only as at B in Figure 4 with a mineral friction compound, which consists of rubber, litharge, and other ingredients, such as barytes, asbestine, sulphur, in a warm or plastic state, and the strip, so treated on one side, is subjected to high pressure, so as to force this plastic material from the back to the front of the fabric filling interstices between the cords, but leaving the wear surface of the strip not covered over with this plastic material.

Figure 7:
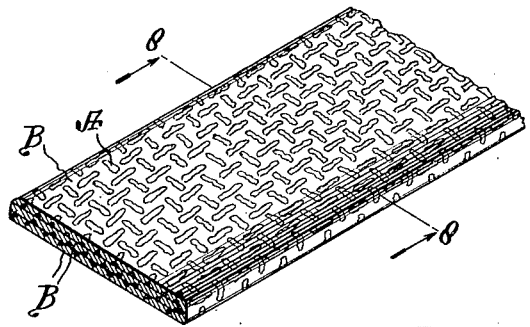
Figure 7 shows a strip of brake band composed of several layers of fabric superposed and joined together, as will be hereinafter described.
Figure 8:
Figure 8 shows a section along the line 8—8 of Figure 7, looking in the direction of the arrows, the parts being shown on a larger scale.

A series of strips, such as shown in Figure 6, are then folded over or superposed as shown in Figures 7 and 8, where I show three of such strips, but two or more may be used if desired. In superposing these strips, the coated side B of each strip is adjacent to the uncoated side A of the adjacent strip, as shown most clearly in Figure 8. This is important because in the former practice of making brake bands it has been generally customary to coat both sides of each strip before these strips are superposed with the result that there is a doubling of the coating at the adjoining surfaces of the adjacent strips; whereas by coating each strip on one side only, a substantially uniform coating of rubber material will permeate the entire mass.

As the brake band wears down, there will be very little variation in the nature of the friction surface exposed to the drum.

After the strips are superposed, as just mentioned, to form the lining for a brake band, they are subjected to high pressure and sufficient heat to cure or vulcanize the rubber to the desired extent, so that the strips will not only adhere to form a band, but the material contained in the rubber will be properly held therein.

After being prepared as above described, the lining may be treated with a solution of fire and water proofing material composed of suitable oxidizing oils, China wood, or rosin oils, or other similar liquids, which will be converted into carbon under heat, and, after being so treated, the lining is again heated or baked at a high temperature for a sufficient period, five hours, more or less, for a final treatment.

After such treatment, the product is an aged or cured brake lining, and is better able to withstand wear and heat.

Figure 9:
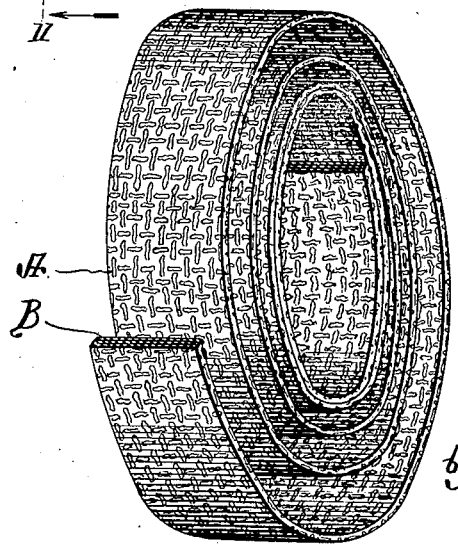
Figure 9 shows a roll of the brake band lining ready for shipment, which should be cut into strips of the desired length when used.

A strip of the finished brake lining band is shown in Figure 7, and Figure 8 shows an enlarged section of the same, while Figure 9 shows a long strip of the brake lining made up into a roll ready to be shipped to the consumer, suitable lengths of the brake lining being cut from the roll as desired.

Figure 10:
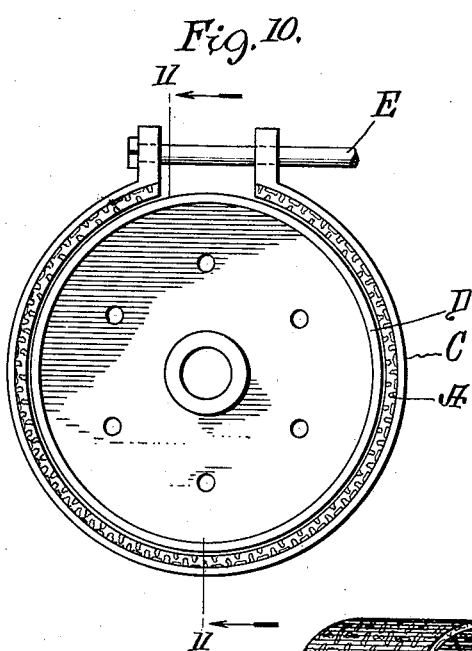
Figure 10 is a diagrammatic view of a brake drum, and brake band surrounding same.
Figure 11:
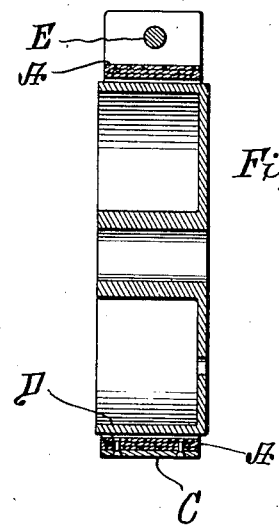
Figure 11 shows a section along the line 11—11 of Figure 10, and looking in the direction of the arrows.

The brake band lining so formed may be applied on the engaging side of any brake band such as C in Figures 10 and 11, surrounding the drum D shown in those figures, and the brake may be applied in any convenient way, such as by the brake rod E. I do not mean to limit the invention, which relates to a brake band lining, to use with any particular form of brake band or any particular form of brake drum.

In use the coated part B of the strips of brake lining should be preferably furthest from the engaging surface of the brake drum. By this construction, there will be little or no tendency of the rubber to flow and stick on the braking surface of the lining, as occurs where the rubber skim is applied to both surfaces of the strips before being assembled into the completed lining. If there is an excessive amount of rubber on this side, there will be a tendency for this to fuse and stick to the drum, preventing the brake lining from becoming disengaged promptly when the brake lever is released.

When the brake lining is first applied this skim coat of rubber causes the brake to grab when the same becomes heated and to give a very low co-efficient of friction when cold. The presence of this layer of rubber has been found so undesirable that many manufacturers have found it necessary to grind or burnish the lining to remove the outer coating of rubber.

This grinding results in the removal of some of the desirable thickness of the lining. I have discovered that by applying the friction compound to one side only, which is done by heavy calenders and forcing the friction material into and just through the open mesh of the cloth, it results in the construction of a brake lining which runs substantially uniform in construction all the way through the lining. It results in the production of a lining whose engaging surface never changes materially no matter how much it is worn.

Having thus described my invention, what I claim and desire to secure by Letters Patent of the United States is:—

1. As an article of manufacture a brake lining strip composed of a series of superposed layers of basket weave woven fabric made of cords formed of twisted strands of asbestos fiber and fine wire, the woof threads of said fabric being spaced apart the same distance as the warp threads, said cords being impregnated with a silicate of soda solution, and said layers being each provided on one side only with a plastic rubber composition, the several layers being joined together into a homogeneous mass by heat and pressure, the said mass being treated with fireproof, water-proof solution and baked.

2. As an article of manufacture a brake lining strip composed of a series of superposed layers of woven fabric made of cords formed of twisted strands of asbestos fiber and fine wire, and said layers being each provided on one side only with a plastic rubber composition, the several layers being joined together into a homogeneous mass by heat and pressure.

3. As an article of manufacture a brake lining strip composed of a series of superposed layers of woven fabric made of cords formed of twisted strands of asbestos fiber and fine wire, each layer having its warp threads spaced apart the same distance as the woof threads, and said layers being each provided on one side only with a plastic rubber composition, the several layers being joined together into a homogeneous mass by heat and pressure.

RICHARD J. EVANS.